United States Patent
Haussler

(10) Patent No.: US 8,049,941 B2
(45) Date of Patent: Nov. 1, 2011

(54) METHOD FOR THE COMPENSATION OF AN INHOMOGENEOUS BRIGHTNESS PERCEPTION IN HOLOGRAPHICALLY RECONSTRUCTED SCENES

(75) Inventor: Ralf Haussler, Dresden (DE)

(73) Assignee: SeeReal Technologies S.A., Luxembourg (LU)

( * ) Notice: Subject to any disclaimer, the term of this patent is extended or adjusted under 35 U.S.C. 154(b) by 478 days.

(21) Appl. No.: 12/158,431

(22) PCT Filed: Dec. 20, 2006

(86) PCT No.: PCT/EP2006/012309
§ 371 (c)(1),
(2), (4) Date: Nov. 17, 2008

(87) PCT Pub. No.: WO2007/071391
PCT Pub. Date: Jun. 28, 2007

(65) Prior Publication Data
US 2009/0180165 A1    Jul. 16, 2009

(30) Foreign Application Priority Data

Dec. 22, 2005  (DE) .................. 10 2005 063 233
Jul. 11, 2006  (DE) .................. 10 2006 031 942

(51) Int. Cl.
*G03H 1/08* (2006.01)
*G02B 5/32* (2006.01)

(52) U.S. Cl. ................................. 359/9; 359/21
(58) Field of Classification Search .............. 359/9, 21
See application file for complete search history.

(56) References Cited

U.S. PATENT DOCUMENTS

| 5,959,664 | A | * | 9/1999 | Woodgate | 348/59 |
| 7,535,607 | B2 | * | 5/2009 | Schwerdtner et al. | 359/9 |
| 7,697,178 | B2 | * | 4/2010 | Teraoka | 359/22 |
| 2006/0250671 | A1 | | 11/2006 | Schwerdtner | |

FOREIGN PATENT DOCUMENTS

| GB | 2 379 347 | 3/2003 |
| WO | WO 2004/031841 | 4/2004 |

OTHER PUBLICATIONS

Fukaya et al., Proc. Intl. Conf. on High Technology, Evolution and Promise, World Techno Fair in Chiba, Proc. Imaging Science and Technology: Evolution and Promise, pp. 355-363 (Sep. 11, 1996), XP009030262.
International Search Report issued in priority Application No. PCT/EP2006/012309.

* cited by examiner

*Primary Examiner* — Jade R Chwasz
(74) *Attorney, Agent, or Firm* — Saul Ewing LLP

(57) ABSTRACT

To compensate for an inhomogeneous brightness perception in a holographic reconstruction of 3D-scenes (4), a computing means encodes modulator cells of a SLM with a hologram point data pattern. Multiple bundles of rays illuminate the surface of the SLM and an array of focusing elements (21, 23) directs the bundles of rays to an observer's eye positions. Geometrical and optical properties of the array cause dissimilarly affected illumination regions on the SLM surface. The computing means determine parameters which describe the extent of these effects in combination with an expected spatial filtering at the eye pupil of the observer's eyes. Using these parameters, the computing means estimates which local errors of the reconstruction caused by these dissimilarly affected illumination regions will be perceived by the observer when watching the reconstruction, and corrects the hologram point data pattern such that the reconstruction appears at a corrected brightness uniformity level.

13 Claims, 3 Drawing Sheets

METHOD FOR THE COMPENSATION OF AN INHOMOGENEOUS BRIGHTNESS PERCEPTION IN HOLOGRAPHICALLY RECONSTRUCTED SCENES

BACKGROUND OF THE INVENTION

1. Field of the Invention

The present invention relates to a method for the compensation of an inhomogeneous brightness perception in scenes which are holographically reconstructed with the help of an electro-holographic device that uses a spatial light modulator means in order to reconstruct three-dimensional scenes holographically. The spatial light modulator means contains a multitude of holographic modulator cells in which a video hologram is encoded in the form of a hologram point pattern, and which are illuminated with the help of illumination means and focusing means. According to the present invention, a multitude of illumination units illuminates the light modulator means of the holographic device. In a simple case, the focusing means is a lens array with a multitude of lens elements or a lenticular array with a multitude of lenticules with cylindrical surfaces. The present invention chiefly relates to a real-time or near-real-time reconstruction of moving three-dimensional scenes with the help of holographic video means. The present invention further relates to a device with means for the elimination of brightness errors during the holographic reconstruction of scenes.

2. Technical Background

Holographic devices as understood in this invention modulate sufficiently coherent light with the help of a spatial light modulator means. The modulator cells are encoded with a hologram point data pattern and the modulator surface is illuminated with a light wave front, which is capable of generating interference, such that in a space in front of, on and behind the surface of the light modulator a spatial pattern of object light points is created by way of interference, said pattern of object light points reconstructing the optical appearance of a scene. The entirety of the light of all object light points propagates in the form of a light wave front, so that one or multiple observers can watch this light point pattern in the form of a three-dimensional scene. This means that in contrast to a stereoscopic representation, a holographic reconstruction realizes an object substitute, which is why the problems known in conjunction with stereoscopy, such as fatigue of the eyes and headache, do not occur, because there is generally no difference between watching a real scene and a holographically reconstructed scene.

The holographic device can be a holographic display, which renders visible the reconstruction in front of the eyes of one or multiple observers, or a projection device, which enlarges the reconstruction using optical means. Graphics panels, which are only a few centimetres in screen diagonal length, used in flat screen monitors and in spatial light modulators used in conventional video and TV projectors, are suitable for light modulation, for example. Known holographic devices use either transmissive or reflective light modulators.

3. Prior Art

Known devices for the holographic reconstruction of three-dimensional scenes contain optical focusing means, such as lenses, which form sufficiently coherent light, i.e. light which is capable of generating interference, into a wave, which then impinges on a transmissive spatial light modulator. The thus illuminated light modulator is encoded with a hologram and modulates the wave so as to form a wave front that carries holographic information for the reconstruction of a scene by way of interference. The light modulator thereby generates in its image-side focal plane a spatial frequency spectrum as the Fourier transform of the hologram. Such a holographic device is known for example from the international patent publication no. WO 2004/044659.

During the optical Fourier transformation of the focused light, the scene which is encoded on the light modulator is reconstructed and one or multiple virtual observer window(s) is (are) created in front of the positions assigned to the observer eyes. The size of each observer window corresponds with a period of the spatial frequency spectrum of the Fourier transform. The virtual observer window is located in the diffraction order used for the hologram. The scene is only visible in a reconstruction space through an observer window. The focusing means cover the entire modulating area of the light modulator. The light modulator can be encoded such that the reconstruction space continues behind the light modulator. An observer can thus watch the reconstructed scene in a reconstruction space which is much larger than the observer window.

Because for a large-size holographic reconstruction the light modulator is required to have a large modulating area, the lens must be of adequately large size as well. A lens with such a large area and a single optical axis can only be manufactured at great cost and effort.

In the international patent publication No. WO 2006/119920, the applicant suggests to illuminate the spatial light modulator with a light array of point or line light sources and a lens array with a multitude of lenses, e.g. a lenticular array, instead of using a single light source in conjunction with a large focusing lens. This greatly reduces the thickness and weight of the lens compared with the previously described holographic device, which minimises the costs considerably in particular for large light modulating areas, which only renders feasible the reconstruction of large-size three-dimensional scenes with the help of video holography. Each individual lens element of the lens array can be much smaller than the light modulating area, e.g. with a lens element aperture of about 10 mm. Such a lens array can be manufactured much more easily than a single large lens.

FIG. 1 shows an example of a device disclosed in WO2006/119920 and illustrates its functional principle. An array of illumination units with three coherent line light sources $LS_1$-$LS_3$ and lens elements 21-23 of a lens array 2, illuminates a transmissive light modulator SLM, which consists of a multitude of modulator cells. An illumination unit consists of one light source $LS_1$, $LS_2$ or $LS_3$ and the nearest lens element 21, 22 or 23 of the lens array 2. The light of one illumination unit is capable of generating interference, but the light of different illumination units are not capable of generating interference with respect to each other. All lens elements 21-23 project their corresponding light source into a focal plane FP, i.e. at a defined distance to the light modulator SLM. Each lens element thereby realises a Fourier transformation. The Fourier transforms coincide and project a virtual observer window $OW_L/OW_R$ in front of the left and right observer eyes, respectively.

Each illumination unit of the array thereby illuminates with a bundle of rays a separate region R1, R2, R3 on the surface of the light modulator SLM, so that all illumination units together illuminate the entire area of the light modulator in the form of a common light wave front. A common hologram sequence, which after modulation of the light wave front holographically reconstructs the moving three-dimensional scene with the help of light points P1, P2 and P3, is encoded on the light modulator SLM for the common wave front of all illumination units. As in the device described above, a holographic reconstruction 4 of the three-dimensional scene is situated between the light modulator SLM and the virtual observer window $OW_L/OW_R$. In order to ensure smooth operation, the bundles of rays from the illumination units must illuminate the surface of the light modulator SLM without gaps and without overlapping. Otherwise there may be spatial areas which are not properly illuminated and which therefore appear as dark spots in the reconstruction.

A special feature of this solution is that the modulator cells are encoded in a particular way. In contrast to the conventional encoding of holograms, the hologram information of each object light point of the scene to be reconstructed is not distributed across all modulator cells of the light modulator SLM. According to an above-mentioned patent application, the applicant suggests that, depending on the size and position of the virtual observer windows $OW_L/OW_R$, the information for each object light point is only encoded on a certain area A1, A2, A3 on the surface of the light modulator SLM. Note that the illuminated regions R1, R2, R3 do not correspond with the encoded areas A1, A2, A3.

It has been found in practice, however, that in the process of holographic reconstruction a light wave front which is based on multiple illumination units, as described above, causes a disturbed optical perception. In particular, observers perceive inhomogeneities in brightness in the reconstructed light wave front, even when the array of illumination units illuminates the light modulator SLM homogeneously. This problem was investigated extensively until a cause was found for the perceived disturbances. Finally, the cause for this problem was identified to be the interplay of the edges between adjacent lens elements of the lens array and the observer's eye pupils. Each joint, i.e. junction or boundary, between the lens elements is formed as an edge, which causes diffraction and thus disturbs the straight propagation of the light wave front towards the focal plane. As the spatial frequency distribution is filtered at the observer's eye pupils, which are located in the focal plane, not all frequencies of the spatial frequency spectrum continue to the retina of the observer's eyes. This causes the observer to perceive the reconstructed scene with an inhomogeneous brightness distribution that corresponds to the pattern of the lens array, which deteriorates the quality of the reconstructions considerably.

Diffraction at the edges of the lens elements of a lens array is particularly disturbing, because these edges lie within the reconstructed scene. If, due to the spatial frequency filtering, brightness inhomogeneities become visible at the lens margins within the reconstructed scene, this is considered to be particularly disturbing by the observers. Lens element aberrations also contribute to an inhomogeneous brightness perception.

Document WO 0075733 A1 entitled "Aberration control of images from computer-generated holograms" discloses a method for generating computer-generated hologram data for encoding the spatial light modulator of a holographic display by which aberration effects of optical components of the display are compensated. The method determines the aberrations of optical components in the holographic display and defines computer-generated hologram correction factor data for the light modulator such that the determined aberration effect is compensated. A hologram point data pattern is generated for the light modulator such that the holographic display produces a high quality holographic reconstruction.

The aberration effect of the optical components of the display for defining the computer-generated hologram is determined with the help of the optical distance of the beams through the optical components and stored in a so-called look-up table. In the above-mentioned document, imaging errors such as distortion etc. are understood as aberrations.

SUMMARY OF THE INVENTION

An implementation of the invention is based on a holographic reconstruction with the help of modulator cells in a spatial light modulator means, where multiple bundles of rays, each of which is capable of generating interference with respect to itself, illuminate the light modulator means. An array of focusing elements, which perform an optical Fourier transformation, directs the bundles of rays on to the eyes of at least one observer. On the one hand, discretely illuminated regions are defined on the surface of the light modulator means, which have a core area that corresponds with the geometry of the assigned focusing element and marginal areas which correspond with the margins of the focusing elements. On the other hand, the Fourier transforms of the bundles of rays coincide in front of the eyes, i.e. in a focal plane.

The array of focusing elements is designed geometrically such that all bundles of rays form a common light wave front, which illuminates the modulator cells of the light modulator means. This light wave front reconstructs, through object light points, a common three-dimensional scene as a result of the spatial amplitude and/or phase modulation, which is brought about by the hologram point data pattern encoded on the light modulator means. The encoded and illuminated light modulation means thus realise the function of a video hologram.

Although the brightness of the light wave front is homogeneous, the light wave front exhibits instances of disturbed light propagation, which are caused by light propagation errors in the edge regions of the focussing elements which lead to dissimilarly affected illumination regions on the modulator means surface. Especially, diffraction of the light at the edges of the focusing elements causes that the observer perceive reconstructed object light points at incorrect brightness levels. This brightness corruption is caused by the interplay of light diffraction at the edges of the focusing means, the marginal areas projected from those edges onto the light modulator means and the spatial frequency filtering of the restricted aperture of the eye pupil, which is located in the focal plane. It has been shown that the type of perceived brightness corruption depends greatly on the kind of modulation employed by the spatial light modulator means. The latter will be described in detail below.

Now, the object of the present invention is to provide a simple but highly efficient method for the elimination of this inhomogeneous brightness perception of certain object light points during the holographic reconstruction with the help of light modulator means which are simultaneously illuminated by multiple illumination units.

The method according to an implementation of this invention takes advantage of the finding that the geometrical design of the focusing means used for illuminating the spatial light modulator means, the type of modulation of the spatial light modulator means, the position of the observer eyes, e.g. distance from the modulator or direction, and the brightness of the reconstruction, and thus the aperture of the eye pupil while watching the reconstruction, can each be defined as parameters.

After computing means have defined, in the hologram point data pattern of the light modulator means, those modulator cells which due to the geometry of the array of focusing elements are affected by light diffraction at the edges of the focusing elements, it is thus possible to create for each of those affected modulator cells parameters which describe the extent of this effect in combination with the expected filtering properties of the observer's eye pupils.

The computing means estimate on the basis of the above parameters which local errors of the reconstructed three-dimensional scene will be perceived when watching the reconstruction. The computing means correct corresponding values for modulator cells in the hologram point data pattern to compensate the effect of such modulator cells which contribute to an interference point which causes the corresponding object light point to appear in the reconstruction at a corrected brightness.

DETAILED DESCRIPTION OF THE INVENTION

Figure 1:
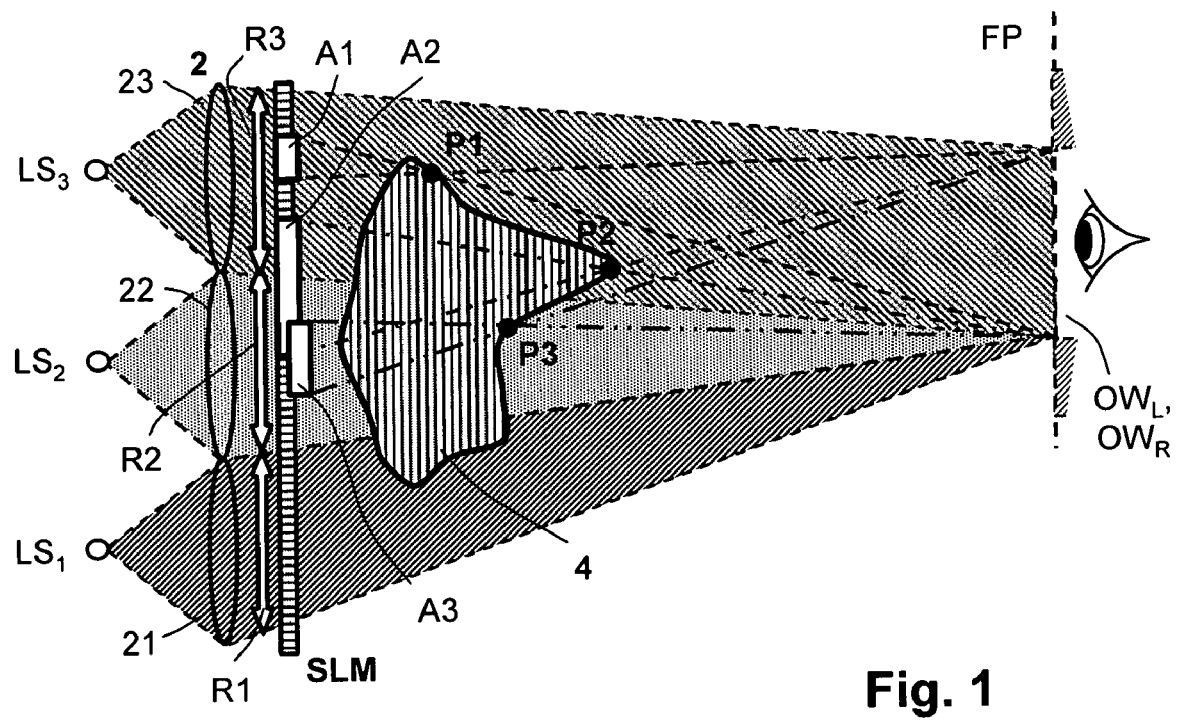
FIG. 1 shows an example of a prior art holographic device known from WO2006/119920.

In an implementation of the invention, we compensate for an inhomogeneous brightness perception in a holographical reconstruction of three-dimensional scene, which consist of object light points. Computing means encode modulator cells of a spatial light modulator means with a hologram point data pattern; applicant has described such systems in WO 2004/044659-A1, WO 2006/027228-A1, WO 2006/066919, and U.S. 2006-0250671-A1; the contents of which are all incorporated by reference and provide useful background information which may be helpful to a full understanding of the present invention.

Returning to the present implementation, we have multiple bundles of rays, in which each bundle is capable of generating interference with respect to itself; the rays illuminate the surface of the light modulator means. Further, an array of focusing elements directs the bundles of rays to coincide near to eye positions assigned to at least one observer's eyes. However, there may be diffraction at the edges of the focussing elements. In this implementation, computing means are employed to modify the values of the hologram point data to compensate for (i) the diffraction at the edges of the focussing elements and (ii) spatial filtering at an eye pupil of the observer's eyes; in order to give a reconstruction of a required uniformity of brightness.

One or more of the following parameters are taken into consideration by the computing means when modifying the values of the hologram point data: geometrical design of the focussing elements; observer distance to the spatial light modulator; observation angle; aperture of the eye pupil; optical wavelength; degree of coherence of the light source; type of modulation used in the spatial light modulator. The computing means may also compensate for spherical lens aberrations. Also, as will be explained in more detail below, if the observer's pupils exhibit low-pass filtering, then computing means compensates for the dark lines that would otherwise occur. Conversely, if the observer's pupils exhibit high-pass filtering, then the computing means compensates for the bright lines that would otherwise occur.

For the subject matter of this invention it is not relevant whether the light modulator means are illuminated using a single light source, such as a powerful laser with a broadened beam, or using multiple light sources which are not capable of generating interference with respect to each other and which are arranged in separate illumination units, e.g. LEDs. The focusing means in each illumination unit contains at least one separate focusing element, for example a lens, in a simple example. However, lens systems such as tandem lens arrays may be used as well. The focusing elements are arranged together in an array, which is disposed near the light modulator means. The order of the array and of the light modulator means may be interchanged.

As described in WO2006/119920, each individual bundle of rays capable of generating interference can be generated by a separate illumination unit. In that case each illumination unit contains a separate light source, and the focusing elements of all illumination units are grouped in an array. That disclosure takes advantage of the finding that in the process of the reconstruction described above two Fourier transformations take place. The focusing elements in the illumination units perform a Fourier transformation from the plane of the focusing elements to the observer's eye lenses. When these first Fourier transforms have coincided on the eye lenses, the observer's eye lenses perform a second Fourier transformation on to the retina of the respective observer's eyes. During the first Fourier transformation, the light distribution from the plane where the array of focusing elements is located is transformed. The Fourier transform of the light distribution is thus created in the plane of the eye pupil. The finite extent of the eye pupils spatially filters the Fourier transform of the light wave front, which already contains the interference points of the reconstruction. The zero point of the spatial frequencies in the eye lenses thus always lies in the centre of the light source image.

The light source images can be inside or outside the eye pupils of the observer. The position of the light source image in relation to the eye pupil is determined by the kind of modulation the light modulator means utilizes. The kind of modulation utilized depends on how the complex hologram values are encoded on the light modulator means. The kind of modulation utilized finally determines the diffraction order which can be used for reconstruction and the position at which the virtual observer windows may lie.

If the virtual observer windows are positioned such that the light sources are imaged inside the eye pupils, the finite eye lens width will effect a low-pass filtering of the spatial frequencies and suppress high spatial frequencies. This kind of modulation of the spatial light modulator means can for example be realised with the help of a phase-modulating light modulator. In contrast, only high spatial frequencies pass through the eye lens if the virtual observer windows are positioned such that the eye pupils are beside the light source image. The eye pupils then act as high-pass filters.

During the second Fourier transformation, the filtered complex amplitudes are transformed from the plane of the eye pupil to the retina. An image of the reconstructed scene is thus created on the retina, but in this scene some spatial frequencies are missing due to the spatial filtering effect of the eye pupil.

In addition to light modulator means which predominantly employ the principles of amplitude or phase modulation, the present invention can also be applied to light modulator means which combine multiple spatial light modulators which employ the same or different kinds of modulation.

Because in the holographic reconstruction device described above both the functional principle of the spatial light modulator means and the geometrical design of the focusing means used to illuminate the spatial light modulator means are given as fixed parameters, the optical error caused by the illumination for reconstruction can be compensated, according to the present invention, with the help of corrective components calculated using computing means; the corrective components may be used in encoding the spatial light modulator means.

However, during the calculation it must be considered that the observer's eyes do not perceive the hologram point data patterns which are encoded in the illuminated modulator cells of the light modulator means, but rather the reconstructed spatial object light points which have been generated as a result of the interference of many light waves. These light waves are defined by the momentary modulation values of the multitude of illuminated modulator cells. The task of the computing means is thus to correct the momentary modulation values for the entirety of modulator cells involved in the result of the interference such that when a spatial object point is created the effects of light diffraction at the edges of the focusing elements are corrected.

In a preferred embodiment of the invention the computing means calculate a hologram based on object data of a three-dimensional scene and carry out the following steps iteratively in order to correct the hologram point data pattern:

Simulation of how the observer would see a sample object reconstructed from a hologram, taking into account the diffraction of light at the edges of the focusing elements, spatial frequency filtering at the eye pupil and aberrations of the focusing elements, Comparison of the brightness distributions of the original sample object and the simulated sample object reconstruction, and calculation of the correction values required, Applying the correction values calculated in the previous step for the brightness distribution of the object data of the three-dimensional scene.

Further embodiments of the present invention are explained in detail below and are illustrated in conjunction with the accompanying drawings. The invention will hereunder be described in conjunction with a holographic display with a flat screen panel, which holographically reconstructs the three-dimensional scene directly in front of the eyes of an observer using monochromatic light. However, it will appear to those skilled in the art that this invention may be applied to any other holographic reconstruction, e.g. colour holographic reconstructions.

Figure 2:
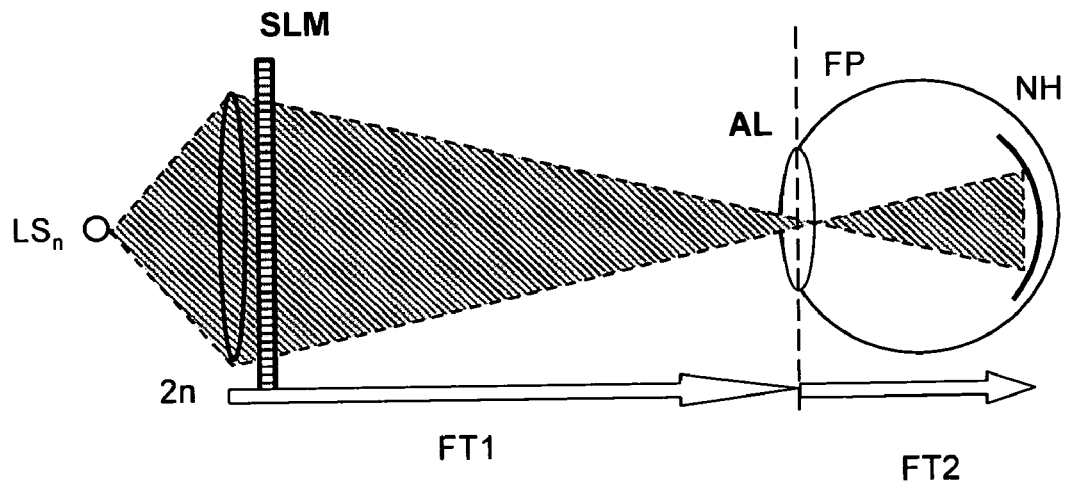
FIG. 2 shows a detail of the design of the entire optical system including an observer eye.

FIG. 2 shows a detail of the design of the entire optical system including the relevant optical components of an observer's eye. The system contains light sources $LS_n$, which emit light which is capable of generating interference, and a lens array with lens elements $2n$, where one light source and one lens element together represent an illumination unit for illuminating a region of the surface of a spatial light modulator SLM. For reasons of clarity, only one light source $LS_n$ and one lens element $2n$ of the lens array are shown in the Figure, but in general there are n light sources and at least n lens elements, where n is a whole number greater than one. The lens element $2n$ projects the light source $LS_n$ in the form of a bundle of rays through a locally confined region of the transmissive light modulator SLM. The other regions of the light modulator are illuminated in the same way by the other illumination units. The lens elements are disposed in a plane array and each lens element of an illumination unit performs an optical Fourier transformation FT1 from the array plane into a focal plane FP. All bundles of rays are adjusted such that, on the one hand, they pass the light modulator SLM near the array plane in discrete regions R1-R3 (see FIG. 1) and, on the other hand, they coincide in a virtual observer window, which is situated in the plane of the eye lens AL and thus in the plane of the Fourier transform FP, so as to form a common light wave front. The light modulator SLM contains modulator cells, which are encoded with a hologram point data pattern such that an observer perceives with the eye lens AL the reconstructed scene in the form of a light wave front with spatially arranged interference points, which correspond with the object light points only in the observer window in the plane of the Fourier transform FP.

An embodiment of this invention can be realised as well if the lens array and the light modulator SLM are interchanged. In that case, instead of considering the light that illuminates the modulator cells, the light that is emitted by the modulator cells and passes through the lens elements towards the observer eyes will be considered.

If the eye lens AL focuses on the array plane while watching the reconstructed scene, the array projects the light wave front with the interference points on to the retina NH. Thereby, a second Fourier transformation FT2 takes place and the eye pupil forms the aperture for the eye lens.

Because the eye pupil has an aperture finite in extent, it spatially filters the Fourier components from the array plane. The lowest spatial frequency is thereby always situated in the centre of the light source image.

Depending on the kind of modulation employed by the light modulator used, e.g. depending on whether the SLM is of an amplitude-modulating or phase-modulating type, there are holographic systems which project the light sources directly on to the eye pupil and systems where the eye pupil is located in a diffraction order, so that the eye pupil is situated beside the light source image. If the light source image lies inside the eye pupil, the pupil exhibits a low-pass behaviour and transmits mainly low spatial frequencies. In contrast, if the eye pupil lies beside the light source image, high spatial frequencies are mainly transmitted.

As a consequence, when calculating the error compensation for the encoding, a high-pass or low-pass filtering, respectively, must be taken into account. The compensation will now be explained in detail with the help of the example of low-pass filtering.

Figure 3:
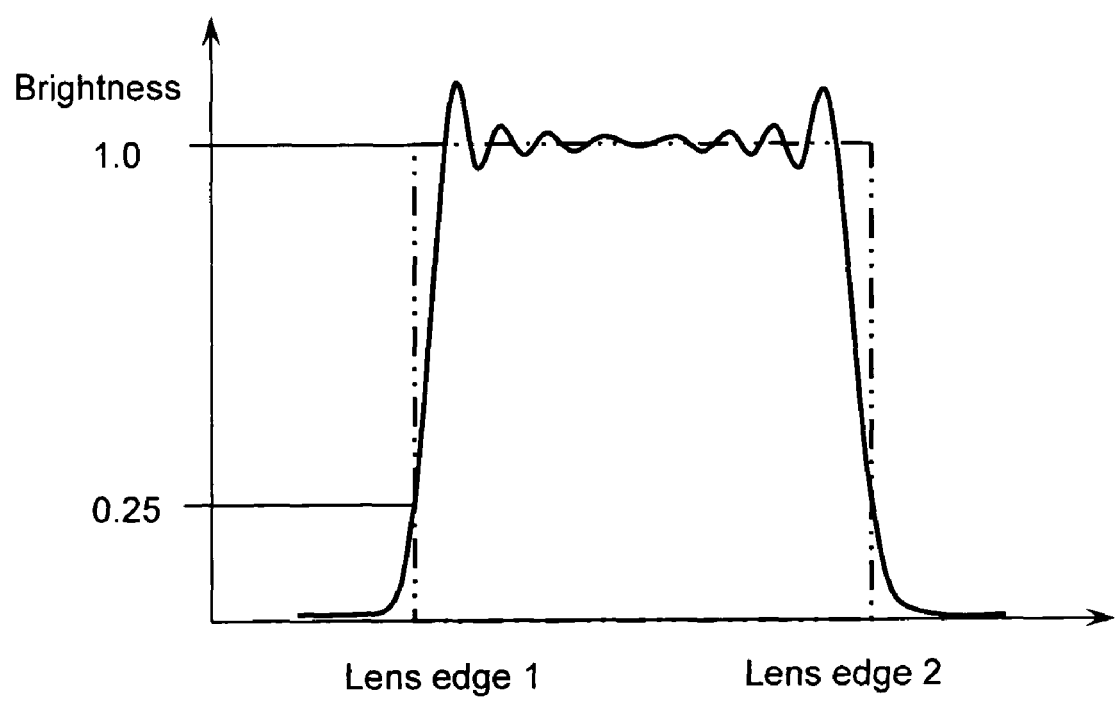
FIG. 3 shows the effects of low-pass filtering by the observer eyes on the brightness perception of a holographic reconstruction.

FIG. 3 shows the effects of low-pass filtering on the brightness at which the eye perceives a homogeneously illuminated lens element. The system employs a kind of modulation such that the light source images lie inside the eye pupil, i.e. the eye lens acts as a low-pass filter and the high spatial frequencies are dampened. Without low-pass filtering, i.e. with an infinite eye pupil, the eye would see the lens element with a rectangular brightness distribution, as shown by the dashed line in the Figure. Due to the fact that the eye pupil in reality has a finite extent, the margins of the brightness profile are rounded, as indicated by the solid line. Here the brightness at the edge of the lens element is 25% of the original brightness. The degree of the rounding of the brightness profile depends on the diameter of the eye pupil. The smaller the eye pupil, the wider is the area leading to a brightness error at the margin of the lens element.

Because adjacent lens elements are illuminated by light sources which are incoherent with respect to each other, the brightness distributions overlap in an incoherent way. The rounding of the brightness profiles due to the low-pass filtering effect is thus perceived in the present case as a dark line in the transitional areas between adjacent lens elements.

Figure 4:
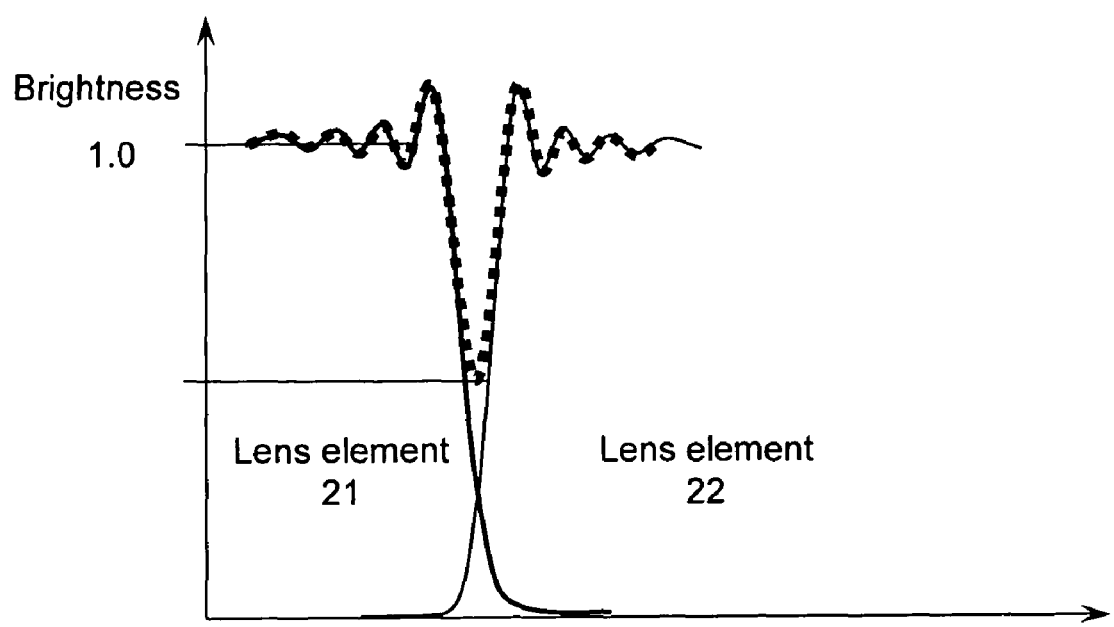
FIG. 4 shows the distribution of brightness perception for two adjacent lens elements.

Because the perceived brightness of adjacent lens element margins overlap, the observer eyes perceive, as shown in FIG. 4, the centres of the transitional areas between two adjacent lens elements with a reduced brightness. Therefore, dark lines occur whose width depends on both the diameter of the eye pupil and the distance between the eyes and the light modulator SLM.

The decline in brightness in the transitional areas between the lens elements also depends on the capability of the light to generate interference. If partially coherent light sources are used, the effect of the lens element margins on the perception is not as great. This is why the degree of coherence must also be taken into consideration when calculating the compensation.

Figure 5:
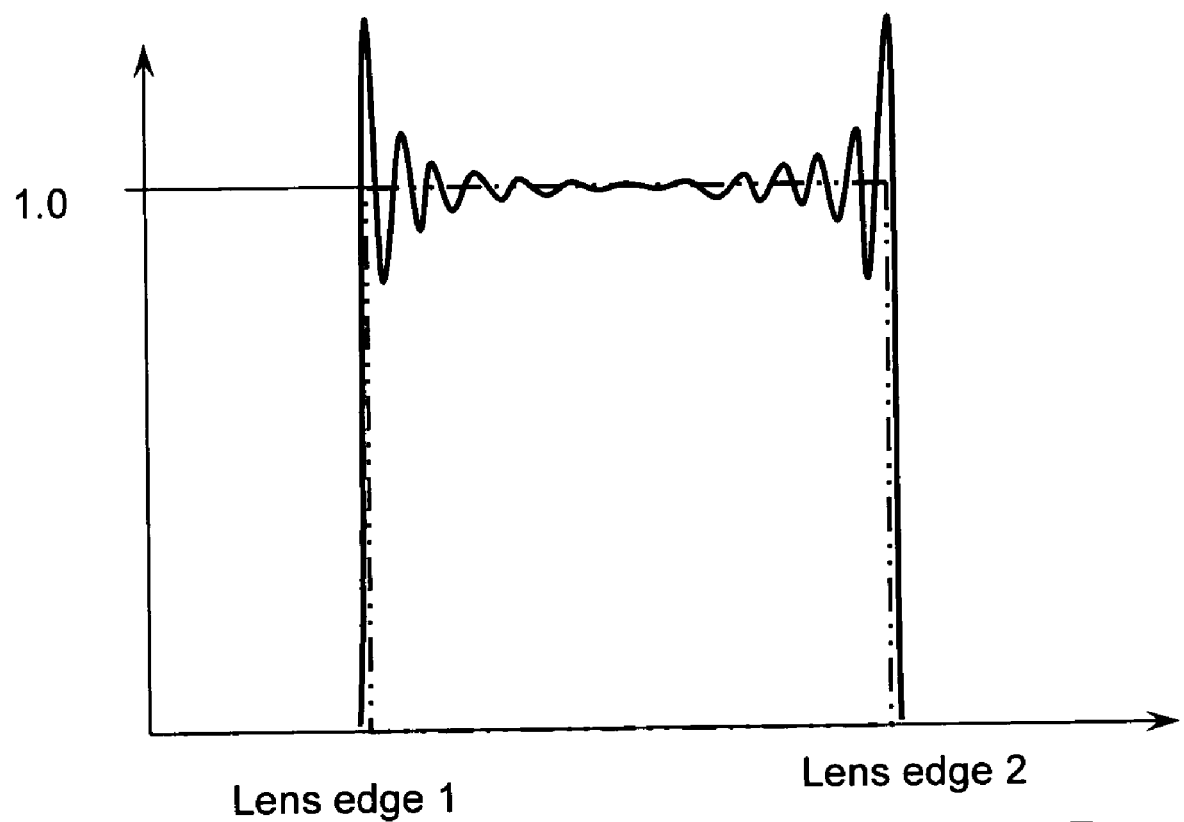
FIG. 5 shows the effects of high-pass filtering by the observer eyes on the brightness perception of a holographic reconstruction.

If a holographic system employs a kind of modulation where the observer windows with the eye pupils are situated in a diffraction order, so that the eye pupil lies beside the light source image, the pupil exhibits a high-pass filtering behaviour and transmits mainly high spatial frequencies. As shown in FIG. 5, in such a case a brightness profile occurs that shows a great exaggeration of the desired brightness level at the margin of a lens element. In such a case, the reconstruction appears brighter in the areas defined by the joins between adjacent lens elements.

In addition to the interplay of the edges of the lens elements with the aperture of the eye pupils, the margins of the lenses also cause the bundles of rays to exhibit deflection errors and, as a consequence, an erroneous illumination of the reconstruction space. Due to spherical aberration which represents one type of aberration, the beams are deflected erroneously near the edges of the lens elements. The further they are away from the light modulator, the more the beams are deflected towards the optical axis. In the same way, the beams through the adjacent lens element are deflected towards its optical axis due to aberrations, so that there will be spatial regions where there is no light available to form interference points.

Both deflections at the lens edges with subsequent spatial frequency filtering at the eye pupil, and the aberrations, can be quantified by way of calculation. All parameters of the optical system, including the human eye, are used as parameters in this calculation. Methods of coherent optics, such as Fourier optics and coherent ray tracing, are suited for this purpose. In this way it can be calculated how the eye perceives the reconstructed object. The ratio of desired brightness and resulting brightness of object light points must then be corrected during hologram calculation.

The parameters which are taken into consideration in compensating the spatial frequency filtering effects and the aberrations depend on the observer distance, the observation angle, the aperture of the eye pupil, the optical wavelength and the degree of coherence of the light source. Because all these parameters are known, an inhomogeneous brightness perception can be compensated for during hologram calculation.

Since holographic reconstruction systems to which the present invention can be applied present the reconstruction in small virtual observer windows, such systems are equipped with an eye finder which is combined with a device for tracking the virtual observer windows in accordance with changes in the eye positions. According to a preferred embodiment, this eye finder can also be used to detect an individual aperture of the observer eyes. Alternatively, instead of an individually determined aperture of the eye pupil, an average value can be assumed, e.g. typically 5 mm for medium overall brightness.

A first option for the compensation is an iterative hologram calculation. In a first step, a hologram is calculated with the help of a known method based on the desired object data to be reconstructed. Based on that hologram it is then calculated how the eye would perceive the reconstructed scene, taking into consideration the deflection at the edges of the lens elements with subsequent spatial frequency filtering at the eye pupil and the aberrations. The ratio of desired brightness and resulting brightness is calculated for each object light point. This ratio is used in the second step of hologram calculation, where the brightness values of the object light points of the scene are adapted accordingly and where the hologram is recalculated based on the adapted object brightness. If an object light point only has 80% of the desired brightness, for example, after the first process step, the brightness is increased to 125% before the second process step, because 80% times 125% equals one. Because the desired reconstruction quality may not be achieved after a single iteration, these process steps may be repeated until the desired reconstruction quality is achieved.

It is also possible to generate compensation values for arbitrary object light points in advance. For this, it is calculated how the brightness perception of an object light point changes depending on low-pass filtering and aberrations. Given an observer distance and the aperture of the eye pupil, this change depends on the distance of the object light point from the array plane, its position in relation to the lens element edge and the wavelength. The position in relation to the lens element edge is determined by drawing a line from the centre of the eye pupil through the object light point to the lens array. Then, the ratio of desired brightness and perceived brightness is calculated for that object light point. If the object light point only has 80% of the desired brightness, for example, an object light point of any object which is to be reconstructed in this position should be given a 125% brightness correction factor during hologram calculation. This correction factor depends on the distance of the object light point from the lens array, the position in relation to the edge of the lens element and the wavelength. The position in relation to the edge of the lens element in turn depends on the position of the object light point in the scene and on the observer position.

Due to the multiple parameters, a set of correction factors may be calculated in advance. During hologram calculation, the value of the correction factor of each object light point may be determined using those values calculated in advance. Because the position in relation to the edge of the lens element changes as the observer moves, the hologram must be recalculated accordingly if the observer moves.

Possible fields of application of the holographic device may include displays for three-dimensional representations, such as computer or TV displays, in commercial or home applications, for the representation of informative or entertaining contents.

The invention claimed is:

1. Method of compensating of an inhomogeneous brightness perception in a holographical reconstruction of three-dimensional scenes, which consist of object light points,
   wherein computing means encode modulator cells of a spatial light modulator means with a hologram point data pattern;
   wherein illuminating means generate multiple bundles of rays, each of which being capable of generating interference with respect to itself, and illuminate a surface of the spatial light modulator means;
   wherein an array of focusing elements directs the bundles of rays to coincide near to positions assigned to at least one observer's eyes, and wherein light propagation inhomogeneities in edge regions of the focusing elements lead to affected regions on the spatial light modulator means in optical contact with the edge regions of the focusing elements
   wherein the computing means is configured to perform the steps of defining the modulator cells and corresponding hologram points in the hologram point data pattern which are located in the affected regions determining parameters which describe an extent of light propagation inhomogeneities effects in combination with an expected filtering from an eye pupil of the observer's eye for the modulator cells thus defined estimating on a basis of parameters which local inhomogeneous brightness of the reconstructed three-dimensional scene caused by these affected regions will be perceived by the observer when watching the reconstruction, and correcting corresponding values in the hologram point data pattern such that the reconstructed object light points appear at a correct brightness.

2. Method according to claim 1 where the computing means define those modulator cells in the hologram point data pattern which are located in a region where diffraction of light at the edges of the focusing elements affects the illumination of the modulator cells.

3. Method according to claim 1 where the computing means define those cells in the hologram point data pattern which are located close to the edges of the focusing elements.

4. Method according to claim 1 where for correction of the hologram point data pattern the computing means take into account the light propagation inhomogeneities in the edge regions of the focusing elements and a spatial frequency filtering at the eye pupils.

5. Method according to claim 1 where during correction of the hologram point data pattern diameters of the eye pupils are taken into account.

6. Method according to claim 5 where an eye finder determines a diameter of the eye pupils of an observer in order to use this information for calculating the hologram point data pattern.

7. Method according to claim 5 where the computing means estimate a diameter of the eye pupil based on an overall brightness of the illuminated surface of the light modulator means.

8. Method according to claim 1 where the computing means correct the hologram point data pattern using object light point data of the three-dimensional scene based on which of the defined modulator cells actually contribute to the reconstruction of individual object light points, in order to minimise a number of hologram point values to be corrected in the data pattern.

9. Method according to claim 1 where, based on a position of the eye pupil and the position of an object point, the computing means define those modulator cells which are located in the region which is subject to the effects of light propagation inhomogeneities in the edge regions of the focusing elements, and where these modulator cells are re-encoded in order to compensate the light propagation inhomogeneities.

10. Method according to claim 1 where the computing means are employed to calculate a hologram based on object data of a three-dimensional scene and carry out the following steps iteratively in order to correct the hologram point data pattern:

simulation of how the observer would see the reconstructed scene based on the hologram, taking into account the light propagation inhomogeneities in the edge regions of the focusing elements and spatial frequency filtering at the eye pupil, comparison of brightness distributions of an original object and a simulated object reconstruction in order to identify incorrect object light points of the reconstruction, calculation of correction values for these identified object light points, applying the correction values to the object light points and re-calculation of the hologram point data pattern to achieve a corrected brightness distribution of the scene.

11. Method according to claim 1 where the computing means are employed to calculate a hologram based on object data of a three-dimensional scene and to carry out the following steps iteratively:

simulation of how the observer would see a sample-object reconstructed from a hologram, taking into account the light propagation inhomogeneities in the edge regions of the focusing elements and spatial frequency filtering at the eye pupil comparison of brightness distributions of an original sample-object and a simulated sample-object reconstruction in order to identify incorrect sample-object light points of the reconstruction, calculation of correction values for these identified sample-object light points, applying the correction values to the object data of the three-dimensional scene and re-calculation of the hologram point data pattern to achieve a corrected brightness distribution of the scene.

12. Method according to claim 1 where the computing means take into account correction values for the following parameters:

observer position and diameter of the eye pupil wavelength of the light used for the reconstruction distance between the object point and the focusing means position of the object point in relation to the edges of the focusing element on a straight line connecting the eye pupil and the object point and continuing to the focusing means light diffraction at the edges of the focusing element and spatial frequency filtering at the eye pupil.

13. Method according to claim 12 where memory means provide the correction values.

* * * * *